United States Patent [19]

Coale

[11] 4,075,158

[45] Feb. 21, 1978

[54] FLEXIBLE PRODUCT MADE FROM A POLY(PHENYLENE SULFIDE) BLEND AND METHOD OF MAKING SAME

[75] Inventor: Harold D. Coale, Bartlesville, Okla.

[73] Assignee: Phillips Petroleum Company, Bartlesville, Okla.

[21] Appl. No.: 640,986

[22] Filed: Dec. 15, 1975

[51] Int. Cl.$^2$ .......................... C08K 7/14; C08L 27/12
[52] U.S. Cl. .............................. 260/42.17; 260/42.18; 260/42.24; 260/42.27; 260/900; 264/211
[58] Field of Search .................. 260/900, 42.27, 42.17, 260/42.18, 42.24; 264/211

[56] References Cited

U.S. PATENT DOCUMENTS 3,487,454  12/1969  Oates et al. ........................ 260/900
3,884,873   5/1975  Short .................................. 260/900

Primary Examiner—James H. Derrington

[57] ABSTRACT

A flexible product having a stiffness of less than 10,000 psi as measured by ASTM D747-70 is made from a mixture of poly(phenylene sulfide) and a filler selected from a group of fillers with at least one of the fillers being polytetrafluoroethylene. The mixture is subjected to pressure to flow same through an orifice and upon exiting from the orifice the mixture is allowed to expand to form the product which is useful as a packing or gasket material.

6 Claims, 1 Drawing Figure

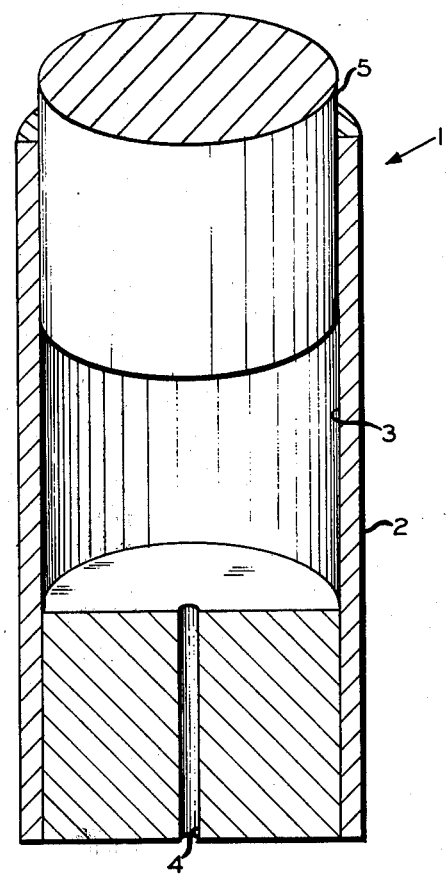

FLEXIBLE PRODUCT MADE FROM A POLY(PHENYLENE SULFIDE) BLEND AND METHOD OF MAKING SAME

In the past it has been found that extrusion of poly(phenylene sulfide), either by itself or in combination with certain fillers, has resulted in an extrudate which is relatively rigid and dense. It has now been found that by the addition of polytetrafluoroetylene in mixture with poly(phenylene sulfide) that flowing of the mixture through an orifice under certain processing conditions results in an extrudate which expands at the exit of the orifice thereby forming a flexible extrudate. Flexibility is a difficult term to define in that all materials are flexible to a certain degree. As hereinafter used, the word "flexibility" is a property of a produce which has a stiffness of less than 10,000 psi as measured by ASTM D747-70, a low stiffness value being equivalent to high flexibility. The product as produced by the disclosed method is very flexible (not stiff) and has a stiffness below the lowest value which can be reliably measured by the above-identified ASTM test and there are no other known standard tests for testing a flexibility as high (low stiffness) as that of the product as defined in the specification below. The product as produced is useful as a packing material or a gasket material and is selflubricating. The product can be formed in almost any suitable shape of cross-section such as round, square, oval, sheet or whatever and is dictated by the shape of the orifice. The produce as described below was unexpected as to flexibility in that past attempts to extrude poly(phenylene sulfide) in mixture with certain fillers resulted in a relatively rigid and dense material.

The principal objects and advantages of the present invention are: to provide a mixture of poly(phenylene sulfide) and filler and a method of processing same to produce a flexibile product; to provide such a mixture and method wherein foaming agents need not be added to the mixture to produce the flexible product; to provide such a mixture which will produce a product which is useful as a packing material or gasket material with self-lubricating properties; and, to provide such a mixture of materials, and method of processing same which is well adapted for its intended use.

Other objects and advantages of the present invention will become apparent from the following detailed description taken in connecton with the accompanying drawing wherein is set forth by way of illustration and example certain embodiments of the present invention.

FIG. 1 is a fragmentary perspective sectional view of an apparatus used in producing the described flexible product.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skiled in the art to variously employ the present invention in virtually any appropriate manner.

The reference numeral 1 designates generally an extrusion apparatus which in the illustrated structure includes a cylinder 2 which forms a material chamber 3. At the exit end of the apparatus 1 an orifice 4 is provided and is shown as elongate and has a cross-sectional area substantially smaller than the cross-sectional area of the chamber 3. The aparatus 1 can be of a plunger or screw type and, as shown, is a plunger type having a plunger 5 movable within a portion of the chamber 3. Such extrusion apparatuses are well known in the art and any further discussion of same is therefore not required.

In the practice of the invention a mixture of poly(phenylene sulfide) and filler is made as by blending the constituent parts of the mixture as, for example, in a high-speed blending apparatus to assure uniformity of mix. The mixture includes poly(phenylene sulfide) and filler with at least one filler material being polytetrafluoroethylene. Poly(phenylene sulfide) is present in the mixture in an amount of at least approximately 30 percent by weight and the polytetrafluoroethylene is present in the mixture in an amount of at least approximately 20 percent by weight of the total mixture. Other suitable fillers which can be added to the mixture of poly(phenylene sulfide) and polytetrafluoroethylene include: glass fibers, asbestos fibers, molybdenum disulfide, carbon fibers, and the like.

The process for producing a flexible product from the mixture of poly(phenylene sulfide) and filler includes, after the blending of the mixture, preferably a precure step to condition the mixture so as to control the melt flow thereof. Precuring is accomplished by heating in air the mixture at a temperature of approximately 450° to 600° F for a time of approximately 4 hours to 24 hours in an atmosphere containing oxygen. This precure step can be followed by a secondary precure step wherein the mixture is heated to a temperature of between approximately 675° to 750° F for a time period of approximately ½ hours to 2 hours. Precuring of such mixtures is well known in the art and need not be further discussed in detail.

The precured mixture is placed in the chamber 3 and pressurized in the apparatus 1 as is well known in the art. The mixture can be either heated before placing same in the chamber 3 or heated while in the chamber 3 to a temperature of approximately 650° to 750° F. After heating, the pressure is applied to the material forcing same to flow through the orifice 4 and out into the atmopshere or alternately into a mold cavity (not shown) and is allowed to expand. Expansion of the material after exiting the orifice 4 is approximately 2 times to 4 times in a cross-sectional dimension. After cooling, the extrudate is an integral or cohesive mass and is flexible and has a stiffness of less than 10,000 psi as described above. Preferably, the extrusion pressure is in a range of approximately 12,000 psi to 30,000 psi and is dependent upon the molding temperature and other molding parameters as is known in the art.

The poly(phenylene sulfide) used herein can be made in accordance to U.S. Pat. No. 3,322,834 issued to H. D. Hill, Jr. et al, May 30, 1967.

By way of specific example, the following is provided:

EXAMPLE I

In the following example, the poly(phenylene sulfide) was prepared according to Example I of U.S. Pat. No. 3,322,834. It had an uncured melt flow (ASTM D1238-651, 5 kg at 315° C) above 2700 g/10 minutes (limit of instrument) and a density (ASTM D150568) of 1.3 g/cc.

A blend of 50 parts by weight of poly(phenylene sulfide), 25 parts by weight of glass fibers (⅛ to ¼ inch long) and 25 parts by weight of polytetrafluoroethylene (PTFE) was prepared by dry blending the ingredients.

The blended mixture was then spread in a tray and was approximately ½-inch deep and heated approximately 10 hours at 520° F and then the temperature was raised to 700° F for one hour to effect the preheat cure.

The precured material after cooling was placed into a 2-inch diameter chamber 3 and the cylinder 2 was placed in an oven and heated to approximately 700° F. After heating, the cylinder was removed from the oven and placed in a hydraulic ram apparatus wherein a plunger was fitted into the chamber 3 to provide pressure on the mixture. A pressure of 16,000 psi was applied to the material by the plunger forcing the heated material to flow through the orifice 4. After exiting the orifice 4, the material was allowed to expand and cool after which same was collected. The orifice was approximately 3/16-inch in diameter and the resulting extrudate was about ¼-inch in diameter and was flexible, that is, limp and very easily bent under its own weight.

EXAMPLE II

A blend was prepared consisting of 50 parts by weight of poly(phenylene sulfide) (the same as used in Example I), 25 parts by weight of glass fibers (⅛ to ¼-inch long) and 25 parts by weight of polytetrafluoroethylene powder. The blend was stirred in an intensive mixer for about three minutes and then spread on a tray approximately ½-inch deep and heated overnight at 520° F and then the temperature was raised to 700° F for about one hour for precuring.

The precured material, 300 grams, was placed in the chamber 3 of the apparatus 1 and then the apparatus was heated in an oven to approximately 700° F after which pressure was applied to the material, 16,000 psi, to extrude the material through the orifice 4. The extrudate was a rope-like product approximately ⅜-inch in diameter, extrusion was through a ⅛-inch diameter orifice, and the product was flexible, that is, limp and very easily bent under its own weight.

EXAMPLE III

A run similar to Example I above was made using the following mixture, 60 parts by weight of poly(phenylene sulfide) (the same as used in Example I) and 40 parts by weight of polytetrafluoroethylene. The mixture was precured as above in Example I and heated to 700° F and pressurized at 16,000 psi and extruded through an ⅛-inch diameter orifice. The resulting extrudate was not as strong, by a hand tension test, as the extrudate of Examples I and II above but was flexible, that is, limp and very easily bent under its own weight.

Another run similar to that of the previous paragraph was made except the blend was changed to 80 parts poly(phenylene sulfide) (the same as used in Example I) and 20 parts by weight of polytetrafluoroethylene and also produced a low strength extrudate which was flexible, that is, limp and easily bent under its own weight. The strength, by hand tension test, was marginally acceptable for a useable extrudate.

EXAMPLE IV

A mixture was prepared from 35 parts by weight of poly(phenylene sulfide) (the same as used in Example I), 40 parts by weight of polytetrafluoroethylene and 25 parts by weight of powdered MoS$_2$. The mixture was precured at 550° F for 8 hours and then heated at 700° F for one hour. The precured mixture was then placed in a 3-inch diameter chamber 3 and heated as in the above examples to 700° F. The chamber was fitted with a piston that had a 1/16-inch smaller than the internal diameter of the chamber. Force was applied to the piston and because the orifice was plugged, the extrudate was extruded between the piston and chamber wall to form a flexible sheet, that is, limp and easily bent under its own weight.

It is to be understood that while I have illustrated and described certain forms of my invention, it is not to be limited to the specific parts herein described aand shown or the specific embodiments disclosed herein.

What is claimed and desired to be secured by Letters Patent is:

1. An extruded product comprising:
    (a) an integral mass comprised of a mixture of poly(phenylene sulfide) in an amount of at least approximately 30 percent by weight of the total mixture weight and filler which includes at least polytetrafluoroethylene in an amount of at least approximately 20 percent by weight of the total mixture weight, said mixture having a stiffness of less than about 10,000 psi as measured by ASTM D747-70.
2. The product as set forth in claim 1, wherein:
    (a) said filler also includes at least one filler selected from the group comprising: glass fibers, asbestos fibers, molybdenum disulfide and carbon fibers.
3. A method of producing a flexible product from a mixture of poly(phenylene sulfide) and filler with the product having a stiffness less than about 10,000 psi as measured by ASTEM D747-70, said method comprising:
    (a) blending poly(phenylene sulfide) with a filler at least one of which is polytetrafluoroethylene to form a mixture, said poly(phenylene sulfide) is in an amount of at least about 30 percent by weight of the total mixture weight and said polytetrafluoroethylene is in an amount of at least about 20 percent by weight of the total mixture weight;
    (b) precuring said mixture a sufficient amount to lower the melt flow an adequate amount to produce a flexible extruded product;
    (c) heating said mixture;
    (d) pressurizing the heated mixture in a chamber; and
    (e) flowing the pressurized and heated mixture through an orifice and allowing the mixture to expand after exiting the orifice to produce a flexible extrudate.
4. The method as set forth in claim 3 wherein:
    (a) said mixture is heated to a temperature of at least approximately 650° F; and
    (b) said mixture is pressurized between approximately 12,000 psi to 30,000 psi.
5. A method as set forth in claim 3 wherein:
    (a) said precuring is conducted in a first step at a temperature in the range of about 450° F to about 600° F for a time period in the range of about 4 hours to about 24 hours followed by a second step at a temperature in the range of about 675° F to about 750° F for a time period in the range of about ½ hour to about 2 hours.
6. A method as set forth in claim 5 wherein:
    (a) the expansion is at least about 2 times in cross-sectional dimension over a corresponding orifice cross-sectional dimension.

* * * * *